(12) United States Patent
Jiang et al.

(10) Patent No.: US 8,838,448 B2
(45) Date of Patent: Sep. 16, 2014

(54) FORCED/PREDICTABLE ADAPTATION FOR SPEECH RECOGNITION

(75) Inventors: Dan Ning Jiang, Beijing (CN);
Vaibhava Goel, Chappaqua, NY (US);
Dimitri Kanevsky, Ossining, NY (US);
Yong Qin, Beijing (CN)

(73) Assignee: Nuance Communications, Inc., Burlington, MA (US)

( * ) Notice: Subject to any disclaimer, the term of this patent is extended or adjusted under 35 U.S.C. 154(b) by 195 days.

(21) Appl. No.: 13/440,176

(22) Filed: Apr. 5, 2012

(65) Prior Publication Data

US 2013/0268270 A1    Oct. 10, 2013

(51) Int. Cl.
*G10L 15/06*    (2013.01)
*G10L 15/00*    (2013.01)

(52) U.S. Cl.
USPC ............ 704/244; 704/245; 704/231

(58) Field of Classification Search
CPC ..... G10L 15/265; G10L 15/06; G10L 15/065; G10L 15/00
USPC ................................. 704/231–257

See application file for complete search history.

(56) References Cited

U.S. PATENT DOCUMENTS

| | | | | |
|---|---|---|---|---|
| 5,864,810 | A | * | 1/1999 | Digalakis et al. ............. 704/255 |
| 6,073,096 | A | * | 6/2000 | Gao et al. ...................... 704/245 |
| 6,442,519 | B1 | * | 8/2002 | Kanevsky et al. ............ 704/243 |
| 2002/0095287 | A1 | * | 7/2002 | Botterweck ................... 704/250 |
| 2007/0192101 | A1 | * | 8/2007 | Braho et al. .................. 704/251 |
| 2011/0295590 | A1 | * | 12/2011 | Lloyd et al. ...................... 704/8 |

OTHER PUBLICATIONS

Wang et al. "MPE-Based Discriminative Linear Transforms for Speaker Adaptation", Computer Speech & Language, vol. 22, Issue 3, Jul. 2008, pp. 256-272.*

* cited by examiner

*Primary Examiner* — Samuel G Neway
(74) *Attorney, Agent, or Firm* — Banner & Witcoff, Ltd.

(57) ABSTRACT

A method is described for use with automatic speech recognition using discriminative criteria for speaker adaptation. An adaptation evaluation is performed of speech recognition performance data for speech recognition system users. Adaptation candidate users are identified based on the adaptation evaluation for whom an adaptation process is likely to improve system performance.

20 Claims, 4 Drawing Sheets

FORCED/PREDICTABLE ADAPTATION FOR SPEECH RECOGNITION

TECHNICAL FIELD

The present invention relates to automatic speech recognition, and specifically to methods of using discriminative criteria for speaker adaptation.

BACKGROUND ART

Automatic speech recognition (ASR) systems try to determine a representative meaning (e.g., text) corresponding to speech inputs. FIG. 1 shows various hardware components of a typical ASR system such as a dictation system on a user desktop. A computer system 10 includes a speech input microphone 11 which is connected through a suitable preamplifier 13 to an analog-to-digital (A/D) converter 15. A front-end pre-processor 17 typically performs a Fourier transform so as to extract spectral features to characterize the input speech as a sequence of representative multi-dimensional vectors and performs the analysis and adaptation in a potentially derived feature space. A speech recognition processor 12, e.g., an Intel Core i7 processor or the like, is programmed to run one or more specialized computer software processes to determine a recognition output corresponding to the speech input. To that end, processor memory 120, e.g., random access memory (RAM) and/or read-only memory (ROM) stores the speech processing software routines, the speech recognition models and data for use by the speech recognition processor 12. The recognition output may be displayed, for example, as representative text on computer workstation display 14. Such a computer workstation would also typically include a keyboard 16 and a mouse 18 for user interaction with the system 10. Of course, many other typical arrangements are also familiar such as an ASR system implemented for a mobile device such as a cell phone, ASR for the passenger compartment of an automobile, client-server based ASR, etc.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\operatorname{argmax}} P(W|A)$$

Given a system of statistical acoustic models, this formula can be re-expressed as:

$$\hat{W} = \underset{W}{\operatorname{argmax}} P(W)P(A|W)$$

where P(A|W) corresponds to the acoustic models and P(W) represents the value of a statistical language model reflecting the probability of given word in the recognition vocabulary occurring.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Many current speech recognition applications can benefit from long-term speaker adaptation using speaker logs, and for that, discriminative methods present a promising approach given its previous successes on acoustic model training. There have been large-vocabulary speech recognition experiments investigating feature-space and model space discriminative adaptation methods for long-term speaker adaptation. The experimental results suggest that though on average discriminative adaptation does not obtain a large gain over the ML-based baseline, there still are some test speakers that receive significant improvement. Speakers with high error rates under the speaker independent model tend to have larger gains with discriminative adaptation. These findings reveal that using discriminative methods for long-term speaker adaptation can provide advantages for speech recognition systems. But it is expensive to run adaptation for all speakers.

SUMMARY

Embodiments of the present invention are directed to using discriminative criteria for speaker adaptation in automatic speech recognition. An adaptation evaluation is performed of speech recognition performance data for speech recognition system users. Adaptation candidate users are identified based on the adaptation evaluation for whom a discriminative adaptation process is likely to improve system performance.

The performance data may for example include recognition error rate data. The adaptation evaluation includes determining a comparative change of adapted recognition models from initial recognition models. The method may further include suggesting performance of the adaptation process to an adaptation candidate user. And, of course, the method may further include also performing the adaptation process for one or more of the adaptation candidate users. In specific embodiments the adaptation process may include one or more of a constrained discriminative linear transform (CDLT) process, a model-space discriminative linear transform (DLT) process, and a discriminative maximum a-posteriori (DMAP) process.

DETAILED DESCRIPTION

Various embodiments of the present invention are directed to automatically identifying speakers who may obtain a meaningful benefit from discriminative adaptation, and then applying the discriminative methods just for these speakers. Experimental results confirm that such an approach can effectively identify those speakers for whom discriminative adaptation is most suitable. Speakers who may benefit from discriminative adaptation can be identified based on the observations that speakers with high recognition error rates under the speaker independent model tend to have larger gains with discriminative adaptation and speakers for which speech models change more significantly when they are exposed to adaptation data also have larger gains with discriminative adaptation.

Figure 1:
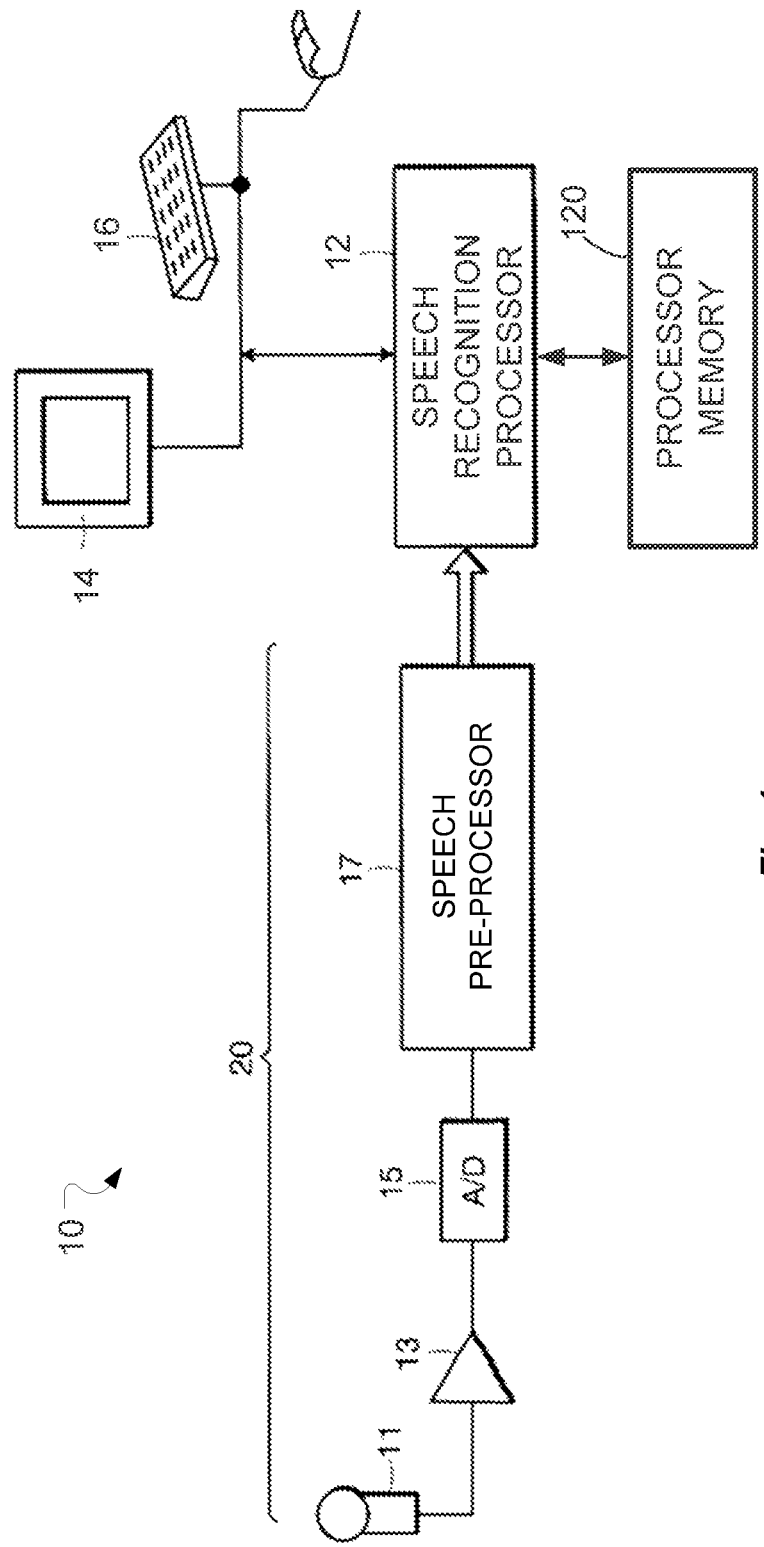
FIG. 1 shows various hardware components of a typical ASR system.
Figure 2:
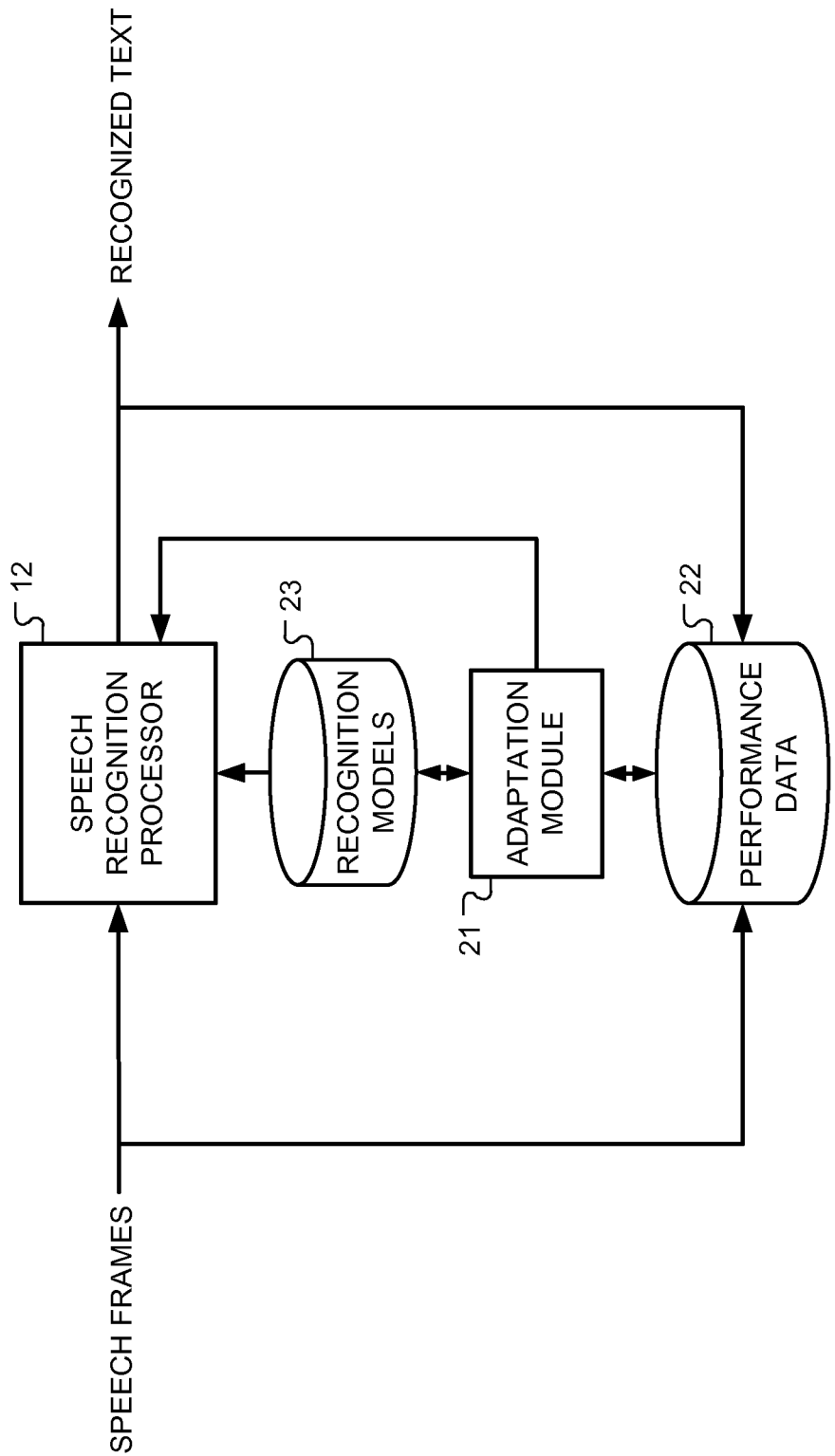
FIG. 2 shows an arrangement of a system for speaker adaptation according to an embodiment of the present invention.

FIG. 2 shows an arrangement of a system for speaker adaptation using discriminative criteria in automatic speech recognition. During normal operation, the speech recognition processor 12 receives incoming speech frames corresponding to a speech input from the user, and provides corresponding recognized text as its output. An adaptation module 21 performs an adaptation evaluation of the stored input and output speech recognition performance data 22 for specific users to identify adaptation candidate users for whom a discriminative adaptation process is likely to improve system recognition performance. For example, the adaptation module 21 may evaluate stored recognition error rate performance data 22 for a given user to determine a comparative change of adapted recognition models from initial recognition models. The adaptation module 21 can identify speakers having high recognition error rates either directly or indirectly.

From time to time, the system may indicate to the user that it is having trouble with some aspects of recognizing the user's speech, and that it might help if he/she would read back a provided phrase. The system can explain to the user the potential benefit of additional adaptation efforts. The system can instruct the user what exactly to do, for example, using short adaptation scripts that include error-prone words for the specific speaker user and prompting the user to read and repeat certain predetermined test phrases or to speak freely (dictation and/or commands) and correct any speech recognition errors. In some embodiments, someone besides the user (e.g. one or more editors) or the adaptation module may correct the speech recognition errors. At a high level this can be thought of as active learning which is customized for the individual speaker and which can be designed to utilize a phrase that the user wants.

Note that the correction of speech recognition errors can be done directly or indirectly. In an indirect approach, the user produces voice commands to control a mobile client or a menu on a host server. If the voice commands are recognized incorrectly, then the user corrects them either by repeating or by explicitly executing the commands via a keyboard/mouse/touch screen interface. Monitoring such corrective actions can enable an overall estimate of the recognition accuracy of speech recognition system. In a direct approach, when a transcription of speech is produced (e.g., a user dictates an email) the user may correct speech recognition errors via keyboard means or other user interface methods.

Some embodiments may predict the possible impact of speaker adaptation by testing how much the speech recognition models change (e.g., based on a Kullback-Leibler divergence between distributions) in a small test course of adaptation (supervised or unsupervised) using a small amount of data. If the change is small, then there is a low likelihood that recognition accuracy would improve with a full suite of discriminative adaptation. And vice versa, for those speakers for which the test adaptation changes the recognition models significantly, it is reasonable to expect a significant positive impact from performing a full adaptation.

Users that are likely to benefit from performing a discriminative training speaker adaptation are then prompted to perform the adaptation process. Typically the adaptation process will perform a suite of discriminative training processes (an adaptation pipeline) to make discriminative adjustments to the system recognition models and the recognition algorithm used by the speech recognition processor.

In general, discriminative adaptation methods try to optimize a discriminative criterion. Given the objective function, a weak-sense auxiliary function can be defined. For each discriminative adaptation method, the model parameters or the speech features can be represented with the adaptation parameters and substituted in the auxiliary function to derive the optimization formula for the adaptation parameters. For example, a specific embodiment may be based on a combination of three discriminative adaptation methods:

Constrained discriminative linear transform (CDLT)
Model-space discriminative linear transform (DLT)
Discriminative Maximum A-Posteriori (DMAP)

Experimental evaluations were performed using such an arrangement.

Constrained discriminative linear transform (CDLT) is somewhat like constrained maximum likelihood linear regression (CMLLR) in that each approach transforms both the model means and variances with the same speaker-specific matrix, so it can be applied at the feature end:

$$\delta(t) = Ao(t) + b = W\zeta(t)$$

where $W=[b^T \ A^T]^T$ and $\zeta(t)=[1 \ o(t)^T]^T$. According to Wang and Woodland, *Discriminative Adaptive Training Using the MPE Criterion*, Proc. of ASRU 2003, pp. 279-284 (incorporated herein by reference), sufficient statistics required to estimate the i-th row of the transforms are as follows:

$$\beta = \sum_{j,m} \sum_t (\gamma_{jm}^{num}(t) - \gamma_{jm}^{den}(t)) + D_{jm}$$

$$G^{(i)} = \sum_{j,m} \frac{1}{\sigma_{jm}^{(i)2}} \left( \sum_t \gamma_{jm}^{num}(t)\zeta(t)\zeta(t)^T - \sum_t \gamma_{jm}^{den}(t)\zeta(t)\zeta(t)^T + D_{jm}Z_{jm} \right)$$

$$k^{(i)} = \sum_{j,m} \frac{\mu_{jm}^{(i)}}{\sigma_{jm}^{(i)2}} \left( \sum_t \gamma_{jm}^{num}(t)\zeta(t) - \sum_t \gamma_{jm}^{den}(t)\zeta(t) + D_{jm} \begin{bmatrix} 1 \\ \tilde{\mu}_{jm} \end{bmatrix} \right)$$

where $\gamma_{jm}(t)$ is the posterior probability at time t for mixture component m of state j, and:

$$Z_{jm} = \begin{bmatrix} 1 & \tilde{\mu}_{jm}^T \\ \tilde{\mu}_{jm} & \tilde{\Sigma}_{jm} + \tilde{\mu}_{jm}\tilde{\mu}_{jm}^T \end{bmatrix}$$

$$\tilde{\mu}_{jm} = A^{-1}(\mu_{jm} - b)$$

$$\tilde{\Sigma}_{jm} = A^{-1}\Sigma_{jm}A^{-1^T}$$

Then the linear transform can be estimated in the same way as with CMLLR. If $\hat{w}_i$ denotes the i-th row of $\hat{W}$ and $p_i$ is the corresponding extended cofactor row vector, then the linear transform can be estimated row-by-row by solving the following equation:

$$\beta \frac{p_i}{p_i w_i^T} - w_i G^{(i)} + k^{(i)} = 0$$

Model-space discriminative linear transform (DLT) transforms the model parameters linearly:

$$\tilde{\mu}_{jm} = A\mu_{jm} + b = W\zeta_{jm}$$

where $W=[b^T A^T]^T$ and $\zeta_{jm}=[1\ \mu_{jm}]^T$. (It may be convenient to only transform the mean vector). According to Wang and Woodland, *MPE-based Discriminative Linear Transform for Speaker Adaptation*, Proc. of ICASSP 2004, pp. 321-324 (incorporated herein by reference), each row of the DLT transform $\hat{W}^{(i)}$ can be estimated via a close solution:

$$\hat{w}^{(i)} = G^{(i)-1} k^{(i)}$$

$$G^{(i)} = \sum_{j,m} \frac{1}{\sigma_{jm(i)}^2}((\gamma_{jm}^{num} - \gamma_{jm}^{den}) + D_{jm})\zeta_{jm}^T \zeta_{jm}$$

$$k^{(i)} = \sum_{j,m} \frac{1}{\sigma_{jm(i)}^2}(\vartheta_{jm}^{num}(O_{(i)}) - \vartheta_{jm}^{den}(O_{(i)}) + D_{jm}\tilde{\mu}_{jm(i)})\zeta_{jm}^T$$

where $\tilde{\mu}_{jm(i)}$ is the adapted mean vector with the initial MLLR transform.

Discriminative Maximum A-Posteriori (DMAP) was originally proposed for style adaptation in Povey et al., *MMI-MAP and MPE-MAP for Acoustic Model Adaptation*, Proc. of INTERSPEECH 2003, pp. 1981-1984 (incorporated herein by reference). By adding a prior term with an appropriate form on the original auxiliary function, the discriminative MAP can be regarded as an interpolation of the current discriminative estimation and the ML based MAP adapted model:

$$\mu_{jm} = \frac{\{\vartheta_{jm}^{num}(O) - \vartheta_{jm}^{den}(O)\} + D_{jm}\hat{\mu}_{jm} + \tau\mu_{jm}^{map}}{\{\gamma_{jm}^{num} - \gamma_{jm}^{den}\} + D_{jm} + \tau}$$

In one set experiments, the center of the discriminative update $\hat{\mu}_{jm}$ was set as the ML-MAP adapted mean $\mu_{jm}^{map}$ and only the mean was adapted with DMAP.

Experiments based on the foregoing showed that even though on average the discriminative adaptation pipeline obtained only a slight gain, still there were some testing speakers who really benefited from it. Because the full discriminative adaptation pipeline uses many computations, it is important to predict the performance of discriminative adaptation using a small computational effort, and only employ the discriminative adaptation methods for those speakers who are likely to obtain a good performance gain.

To predict if the discriminative adaptation could perform well for a given speaker, two small subsets were randomly selected from the speaker's adaptation data, each of which was typically a few minutes long. One subset (called the estimation subset) was used to estimate a global CDLT, and the other (called the evaluation subset) was used to evaluate it. Those speakers whose CDLT transform was expected to perform well on the evaluation subset, then had the full discriminative adaptation pipeline performed. This reflects the assumption that if a simple discriminative adaptation method like CDLT worked well for a given speaker, then he/she was likely to benefit from other discriminative methods as well. Since estimating CDLT based on only a few minutes data was fast for offline adaptation, the additional computation efforts were small.

Several different metrics were studied to evaluate the CDLT performance. Some of these directly measured the recognition performance by comparison to the reference (the reference texts were available since the subset was from the adaptation data). Other metrics measured how much the recognition model had changed during the adaptation. A big change indicated that the adaptation data deviated significantly from the prior model so that the discriminative method might learn the differences better than the ML-based method.

To determine the relative improvement of the frame accuracy (WER was considered but token normalization efforts were needed because the experimental decoding and adaptation vocabularies were mismatched), the evaluation subset was decoded using the adapted/prior model and a unigram language model, and then the decoded state sequence was compared with the alignment state sequence. The relative improvement of the frame accuracy was measured as:

$$\text{fa\_impr} = \text{fa}(\hat{\lambda})/\text{fa}(\lambda) - 1$$

where $\text{fa}(\hat{\lambda})$ and $\text{fa}(\lambda)$ were the frame accuracy of the adapted and the prior model respectively.

The increase of the discriminative objective function score was measured as:

$$\text{objfn\_incr} = F_{bMMI}(\hat{\lambda}) - F_{bMMI}(\lambda)$$

Reduction of the state lattice entropy also was considered. In the state lattice decoded with the prior model, assuming that $\gamma_j(t)$ denotes the posterior probability occupied by state j at frame t, then the entropy $H(\gamma(t))$ measured the uncertainty of the lattice at frame t:

$$H(\gamma(t)) = -\sum_j \gamma_j(t)\log\gamma_j(t)$$

Its expectation can be further estimated by averaging all frames in the evaluation subset:

$$\bar{H}(\gamma(t)) \approx \frac{1}{N}\sum_{t=1}^{N} H(P\gamma(t))$$

If the adaptation was effective, then uncertainty of the lattice should be much reduced after the adaptation, which can be measured by reduction of the state lattice entropy:

$$\text{ent\_reduc} = \bar{H}(\gamma(t)) - \bar{H}(\hat{\gamma}(t))$$

The KL distance between the posterior probability distribution of the lattices before and after the adaptation. The KL distance measured how differently the adapted model performed with the prior model. At frame t:

$$D_{KL}(\hat{\gamma}(t)\|\gamma(t)) = -\sum_j \gamma_j(t)\log\frac{\hat{\gamma}_j(t)}{\gamma_j(t)}$$

Then the average of all frames can be calculated, $\overline{D}_{KL}(\gamma(t)\|\gamma(t))$ to measure each speaker. A large KL distance indicated that the recognition model was greatly changed during the adaptation, which implied that the adaptation data might contain much new information that could be better learned using the discriminative method.

After calculating the above metrics based on the evaluation subset, one set of experiments simply set a threshold for each metric and speakers with a measurement higher than the threshold were selected to employ the full discriminative adaptation pipeline. The percentage of selected speakers could be adjusted by tuning the threshold.

Long-term adaptation experiments were carried out to investigate performance of the full discriminative adaptation pipeline. Boosted MMI objective function was used to optimize the discriminative adaptation parameters. See Povey et al., *Boosted MMI for Model and Feature-Space Discriminative Training*, Proc. of ICASSP 2008, pp. 4057-4060 (incorporated herein by reference). The experiments were based on an English large-vocabulary speech recognition system. The acoustic model used 5 k tied-states and 200 k Gaussian components trained on 2000 hours of data. The recognition features were 24-dimensional vectors computed via an LDA+STC projection from 48-dimensional MFCC features (the static cepstra plus the $1^{st}$, $2^{nd}$ and $3^{rd}$ order derivatives). SAT training was first performed on the speech features, where the speaker-specific transforms were estimated via CMLLR, and then feature-space and model-space MPE training was performed based on the SAT model. The language model used in recognition was a general purpose trigram model. The test set was composed of 96 speakers. For each test speaker, separate adaptation data and test data were available. The adaptation data of each speaker was 1 hour long, and the test data for each speaker was 70 minutes long on average.

In the experiments, besides the offline adaptation, an online multi-class CMLLR algorithm (named OUFA) could also be performed to further improve the accuracy. Table 1 lists the average WERs employing the ML-based adaptation pipeline and the discriminative adaptation pipeline, when the online adaptation was performed or not performed.

TABLE 1

| Pipelines | w/o OUFA | | w/OUFA | |
| --- | --- | --- | --- | --- |
| | Test | Test | Test | Test |
| Speaker- | 10.22 | 10.79 | 8.78 | 9.30 |
| CML | 9.36 | 9.99 | 8.63 | 9.21 |
| CD | 8.87 | 9.56 | 8.47 | 9.08 |
| CMLLR + M | 8.13 | 8.71 | 7.84 | 8.42 |
| CDLT + ML | 7.93 | 8.59 | 7.79 | 8.37 |
| CDLT + DL | 7.72 | 8.48 | 7.62 | 8.24 |
| CMLLR + MLL | 7.61 | 8.14 | 7.37 | 7.91 |
| CDLT + DLT | 7.51 | 8.00 | 7.31 | 7.85 |
| CDLT + DLT+ | 7.52 | 7.99 | 7.28 | 7.82 |

In the condition when the online adaptation was not performed and when only the feature-space adaptation was employed, CDLT performed noticeably better than CMLLR. The relative WER reduction (WERR) on average was 4.3%. When the model-space linear transforms were performed on top of the feature-space adaptation, the gap between the discriminative pipeline (CDLT+DLT) and the ML-based pipeline (CMLLR+MLLR) was reduced but still evident (WERR=2.6%). However, when the MAP style adaptation was further employed, the gain of the discriminative adaptation became much smaller. The WERR of the full pipeline (CDLT+DLT+DMAP vs. CMLLR+MLLR+MAP) was only 1.8%. The results indicated that using the discriminative criterion could benefit more when a simpler adaptation model was employed, but the gain would be much reduced when both the feature-space and model-space adaptation methods were performed. When the online adaptation was performed, it absorbed a part of gains obtained during the offline adaptation. In this condition, even when only the feature-space adaptation was employed, the gain of CDLT compared with CMLLR was still slight (WERR=1.4%). WERR of the full adaptation pipeline (CDLT+DLT+DMAP vs. CMLLR+MLLR+MAP) was 1.1% on average.

Though the discriminative adaptation pipeline only obtained a small gain overall, there still were a number of the testing speakers who significantly benefited from the discriminative methods. For example, 23% of the testing speakers individually obtained a WERR>=3% when both the full offline adaptation pipeline and the online adaptation were performed. Since the discriminative methods require many more computations than the ML-based methods, it is important to first predict the discriminative adaptation performance for each speaker using just a small computation effort, and then perform the discriminative methods only for the speakers who are expected to obtain a good gain. In this way, the system can improve the accuracy with less computation efforts.

Figure 3:
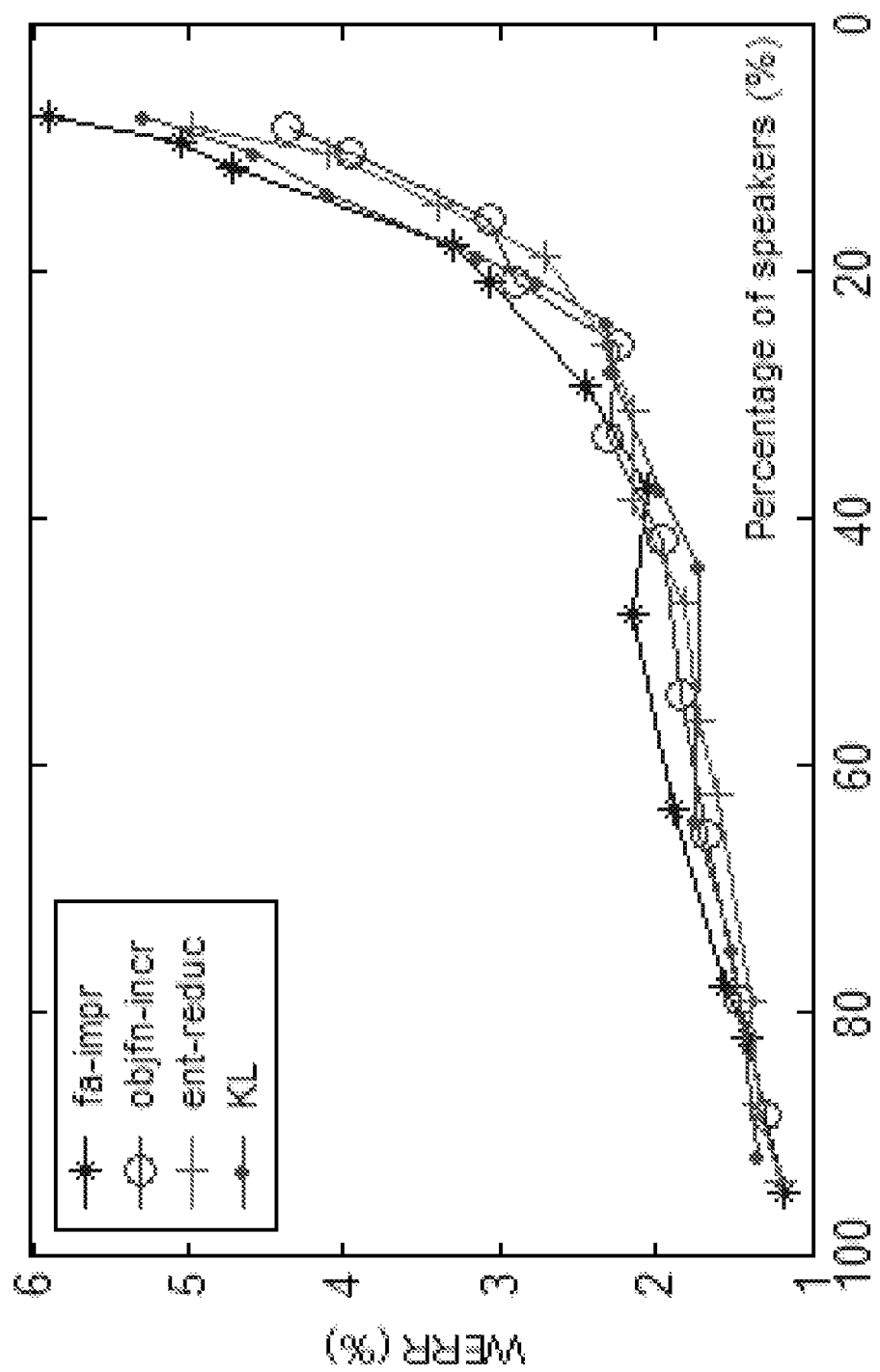
FIG. 3 shows a graph of average WERR data for one set of experiments.

In experimental testing the techniques discussed above were used to select specific speakers for discriminative adaptation. Here the term "WERR" only denotes the relative WER reduction comparing CDLT+DLT+DMAP with CMLLR+MLLR+MAP when the online adaptation was performed. FIG. 3 plots the average WERR of the selected speakers when the percentage of the selected speakers varied. Four metrics were used:
  relative improvement of the frame accuracy (fa_impr)
  increase of the objective function score (objfn_incr)
  reduction of the lattice entropy (ent_reduc), and
  the lattice KL distance (KL)

For each metric, a threshold was set, and speakers were selected whose measures were higher than the threshold. By tuning the threshold, the percentage of the selected speakers could be controlled. FIG. 3 indicates that by using either metric, when a smaller percentage of the speakers were selected, a higher WER reduction could be obtained. That indicates that the most-benefiting speakers could be separated from the whole testing population. FIG. 3 also shows that the relative improvement of frame accuracy performed best in predicting the performance. By using this metric, the WERR was 3.1% when 20% of the speakers were selected, and 4.7% when 10% were selected, which were much higher than the average WERR of the whole population (1.1%).

Figure 4:
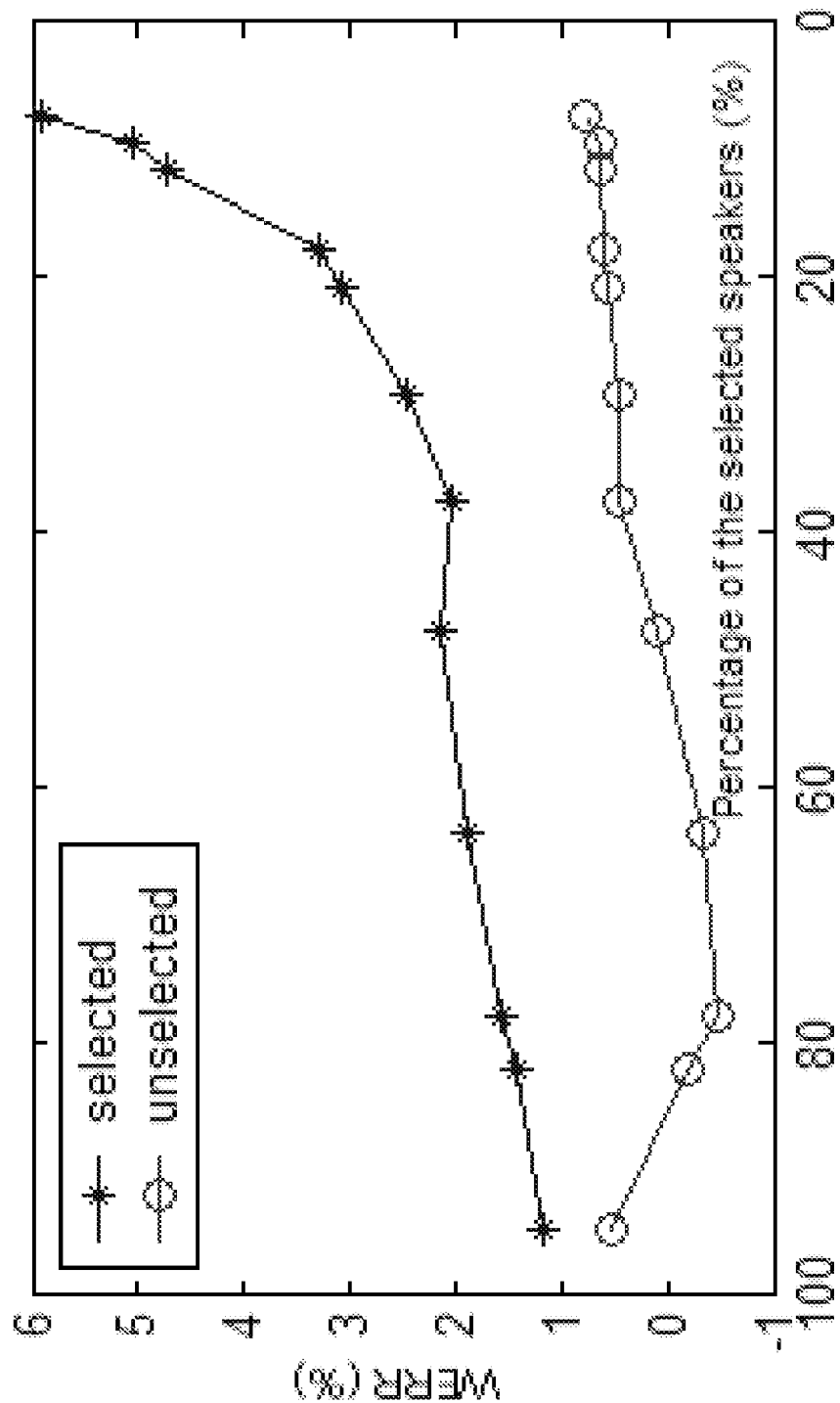
FIG. 4 shows a graph of selected and unselected speaker WERR data for one set of experiments.

FIG. 4 contrasts WERR of the selected speakers and the unselected speakers when the relative improvement of frame accuracy was used. While the discriminative adaptation improved the selected speakers, there was nearly no improvement for the unselected speakers. Thus, applying discriminative adaptation only for the selected speakers would not hurt the system performance. Another interesting observation is that the speakers who were identified to benefit most from the discriminative adaptation tended to be the most poorly recognized speakers. For example, when 20% of the speakers were selected, the average baseline (ML-based adaptation) WER was 9.21%, and when 10% were selected it was 10.03%. They were 16.4% and 26.8% relatively worse than the average WER of the whole testing set, respectively. The results indicated that discriminative adaptation tended to benefit the most for the worst recognized speakers.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method for use with automatic speech recognition using one or more computer processes, the method comprising:
    performing, by a computing device, an adaptation evaluation of speech-recognition performance data for a plurality of speech-recognition system users; and
    identifying, based on the adaptation evaluation, one or more adaptation candidate users for whom an adaptation process is likely to improve system performance,
    wherein the adaptation evaluation comprises determining a change of an adapted recognition model from an initial recognition model.

2. The method of claim 1, wherein the speech-recognition performance data comprises recognition error-rate data.

3. The method of claim 1, wherein the adaptation evaluation comprises determining a comparative change of adapted recognition models from initial recognition models.

4. The method of claim 1, wherein the adaptation process comprises a discriminative adaptation process.

5. The method of claim 1, comprising:
    suggesting performance of the adaptation process to each of the one or more adaptation candidate users.

6. The method of claim 1, comprising:
    performing the adaptation process for one or more of the adaptation candidate users.

7. The method of claim 6, wherein the adaptation process comprises a constrained discriminative linear transform (CDLT) process.

8. A non-transitory computer-readable medium having a computer-program product encoded therein, the computer-program product comprising:
    program code for performing an adaptation evaluation of speech-recognition performance data for a plurality of speech-recognition system users; and
    program code for identifying adaptation candidate users based on the adaptation evaluation for whom an adaptation process is likely to improve system performance,
    wherein the adaptation evaluation comprises identifying a difference between an adapted recognition model and an initial recognition model.

9. The non-transitory computer-readable medium of claim 8, wherein the speech-recognition performance data comprises recognition error-rate data.

10. The non-transitory computer-readable medium of claim 8, wherein the adaptation process is a discriminative adaptation process.

11. The non-transitory computer-readable medium of claim 8, comprising:
    program code for suggesting performance of the adaptation process to an adaptation candidate user of the adaptation candidate users.

12. The non-transitory computer-readable medium of claim 8, comprising:
    program code for performing the adaptation process for one or more of the adaptation candidate users.

13. The non-transitory computer-readable medium of claim 12, wherein the adaptation process comprises one or more of a constrained discriminative linear transform (CDLT) process, a model-space discriminative linear transform (DLT) process, and a discriminative maximum a-posteriori (DMAP) process.

14. A system comprising:
    one or more processors; and
    memory storing instructions that, when executed by the one or more processors, cause the system to:
        determine a change of an adapted speech-recognition model from an initial speech-recognition model based on speech-recognition performance data for one or more users; and
        identify, based on the determined change, a candidate user of the one or more users to use the adapted speech-recognition model.

15. The system of claim 14, the memory storing instructions that, when executed by the one or more processors, cause the system to:
    perform an adaptation evaluation of speech-recognition performance data for the one or more users,
    wherein the performing the adaptation evaluation comprises the determining the change.

16. The system of claim 14, the memory storing instructions that, when executed by the one or more processors, cause the system to:
- perform a plurality of discriminative training processes to make a plurality of discriminative adjustments to a plurality of system-recognition models and recognition algorithms used by a speech-recognition processor.

17. The system of claim 14, the memory storing instructions that, when executed by the one or more processors, cause the system to:
- set a threshold for a metric of the speech-recognition performance data; and
- identify the candidate user based on determining that a metric of speech-recognition performance data associated with the candidate user is above the threshold for the metric of the speech-recognition performance data.

18. The system of claim 17, wherein the metric of the speech-recognition performance data comprises a relative improvement of frame accuracy.

19. The method of claim 6, wherein the adaptation process comprises a model-space discriminative linear transform (DLT) process.

20. The method of claim 6, wherein the adaptation process comprises a discriminative maximum a-posteriori (DMAP) process.

* * * * *